March 19, 1957     R. W. HENNING ET AL     2,785,402
SHIELD AND GAUGE STRUCTURES FOR POWDER-ACTUATED TOOLS
Filed Oct. 28, 1954
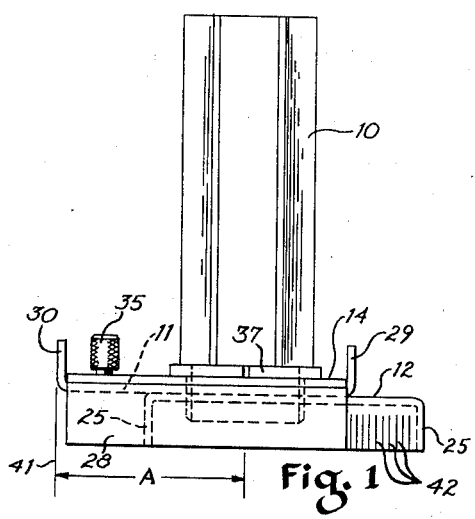
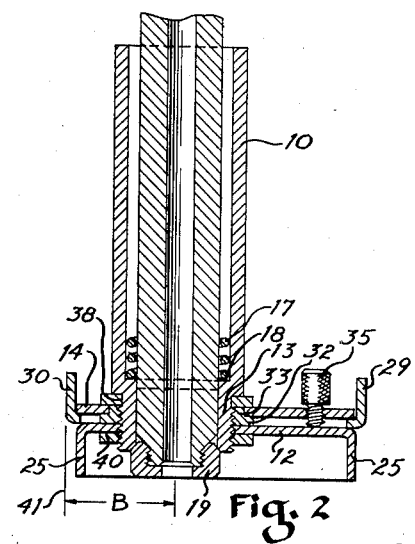
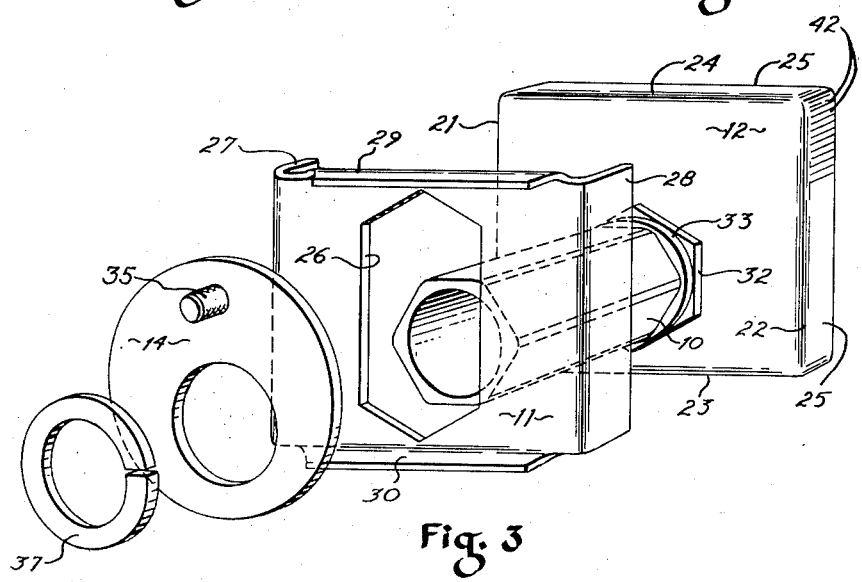
INVENTORS
Robert W. Henning
BY Elmer F. Pfaff
Hyde, Meyer, Baldwin & Doran
ATTORNEYS

United States Patent Office 2,785,402
Patented Mar. 19, 1957

2,785,402

SHIELD AND GAUGE STRUCTURES FOR POWDER-ACTUATED TOOLS

Robert W. Henning, Rocky River, and Elmer F. Pfaff, Mantua, Ohio, assignors to Portable Industries, Inc., Cleveland, Ohio, a corporation of Ohio Application October 28, 1954, Serial No. 465,216

8 Claims. (Cl. 1—44.5)

This invention relates to work-engaging safety shield and spacing gauge structures for use with hand held powder-actuated tools by which pins, studs and the like are embedded, for securing and supporting purposes, in steel, concrete, masonry, etc.

The invention has for its primary object the provision of a safety shield and spacing gauge structure which is characterized by its simplicity of construction, its economy of manufacture, its strong and durable nature, and its general effectiveness as a safety shield for the protection of the operator of the tool with which the structure is used and as a spacing gauge in the positioning of the barrel of said tool.

Further and more specific objects of the present invention, and certain of its practical advantages, will be referred to in or will be evident from the following description of one embodiment of the invention, as illustrated in the accompanying drawing, in which:

Fig. 1 is a side elevational view of a shield and gauge structure embodying one form of the present invention, the extensible shield and gauge member of the structure being in its fully extended position;

Fig. 2 is a longitudinal sectional view of said structure, with the extensible shield and gauge member thereof in its completely retracted position and with the structure being shown as slidably mounted on the front or muzzle end portion of the barrel of a hand held powder-actuated tool for use with said tool; and Fig. 3 is an exploded view of the shield and gauge structure, showing the parts thereof in front perspective.

Before the particular shield and gauge structure here illustrated is specifically described, it is to be understood that such structure is merely illustrative of the present invention and hence, that shield and gauge structures embodying the invention may take various other forms. It also is to be understood that the terminology or phraseology herein used is for purposes of description and not of limitation, as the scope of the present invention is denoted by the appended claims.

For the disclosure of one embodiment of the present invention, there is here illlustrated a safety shield and spacing gauge structure which includes a tubular member 10, a pair of plate-like shield and gauge members 11 and 12 mounted on the front end portion 13 of said tubular member, one of said shield and gauge members being fixedly mounted and the other of said members being extensible and retractible, by sliding movement thereof, relative to said fixed member, and an eccentric disc 14, rotatably located adjacent the front end portion 13 of the tubular member 10, for effecting such extensible and retractible movement of said movable shield and gauge member.

As heretofore mentioned, shield and gauge structures embodying the present invention are particularly useful with hand held powder-actuated tools by which pins, studs and the like are embedded, for securing and supporting purposes, in steel, concrete, masonry, etc., and in Fig. 2 of the accompanying drawing, the use of the present shield and gauge structure is shown with such a tool. For the disclosure of such use, only the front or muzzle end portion of the barrel 16 of such a tool, and certain tool parts associated with the barrel thereof, need be and here are shown, but for a disclosure of the entire tool, reference may be had, if desired, to the copending application of Rowland J. Kopf et al. entitled "Explosively Actuated Tools," application Serial No. 355,034, filed May 14, 1953.

As shown in Fig. 2 of the accompanying drawing, the tubular member 10 of the present shield and gauge structure slidably receives the front or muzzle end portion of the tool barrel 16, with suitable means being provided to releasably maintain said tubular member, and the parts carried thereby, on said barrel. In the present embodiment of the invention, the bore of the tubular member 10 is of such cross-dimensional size that only the front end portion 13 of said member engages the tool barrel, the remaining portion of said bore being of increased cross-dimensional size to receive, around the tool barrel, a coiled compression spring 17. The function of said spring is to yieldably urge the tubular member 10, and the parts carried thereby, forwardly along the tool barrel, and for such purposes, the front end of the spring abuts or engages the annular shoulder 18 of the tubular member 10 which is formed by the enlargement of its bore (Fig. 2) and the rear end (not shown) of said spring engages a suitable abutment (not shown) of the tool. Although any suitable means may be utilized for releasably maintaining the tubular member 10, and the parts carried thereby, on the tool barrel, the means here shown for said purpose comprises a centrally apertured nut 19 which is mounted on the externally threaded front or muzzle end of the tool barrel and which nut also serves as a means for the releasable securement to the barrel or work-engaging or work-clamping jigs or fixtures.

As heretofore mentioned, one of the two plate-like shield and gauge members 11 and 12 is extensible and retractible, by sliding movement thereof, relative to the other of said members. In the form of the invention here shown, member 11, which is the rearmost of the two shield and gauge members, is the one which has such extensible and retractible movement, with member 12 being fixedly mounted on the front end portion 13 of the tubular member 10, such as by being threaded thereon. The fixed member 12 may thus be regarded as the main shield and gauge member of the present structure, with the slidably movable member 11 being regarded as the secondary shield and gauge member thereof.

In the present embodiment of the invention, and as best shown in Fig. 3, the sheet-like body portion of the main shield and gauge member 12 is of generally rectangular shape, with a threaded aperture for the mounting of such member on the threaded front end portion 13 of the tubular member 10. As here shown, said aperture is spaced substantially equidistant from the end edges 21 and 22 of the body portion in which it is located, but spaced somewhat closer to the side edge 23 of such body portion than to the side edge 24 thereof. However, the spacing or location of said aperture in the body portion of the main shield and gauge member may be varied as desired, as will be readily understood.

As best shown in Fig. 3, the main shield and gauge member 12 also is provided, in the present embodiment of the invention, with a forwardly extending peripheral flange, the flange 25 here shown being of integral character and of uninterrupted or continuous form.

With respect to the secondary shield and gauge member 11, it also is here shown as having a generally rectangular sheet-like body portion, with a slot or elongated aperture 26 for the reception of the front end portion 13 of the tubular member 10. The secondary shield and gauge member 11 also is provided, integrally as here shown, with forwardly extending end flanges 27 and 28 and rearwardly extending side flanges 29 and 30. As best shown in Fig. 3, the slot or aperture 26 is elongated in the direction of the rearwardly extending side flanges 29 and 30, and the length of the body portion of the secondary shield and gauge member 11 is such that its forwardly extending end flanges lie just outside the end portions of the forwardly extending peripheral flange 25 of the main shield and gauge member 12. As a result, the extensible and retractible movement of the secondary shield and gauge member 11 over and relative to the main shield and gauge member 12 is guided by the engagement of its end flanges 27 and 28 with the end portions of the flange 25 of said main member, with no objectionable end play between said members, as will be readily understood. Preferably and as best shown in Fig. 1, the front end edges of the forwardly extending flanges of the two shield and gauge members lie in the same plane for work-engaging purposes.

In the here illustrated embodiment of the invention, the body portion of the secondary shield and gauge member 11 surrounds the front hexagonal shaped portion 32 of a nut threadedly mounted on the front end portion 13 of the tubular member 10 (see Figs. 2 and 3), with the slot or elongated aperture 26 in said body portion being of such width as to slidably engage the two opposite sides of such nut portion 32.

For effecting extensible and retractible movements of the secondary shield and gauge member 11 relative to and over the main shield and gauge member 12, the eccentric disc 14 has circumferential engagement with the rearwardly extending side flanges 29 and 30 of said secondary shield and gauge member, the diameter of said eccentric disc preferably being the same, or substantially so, as the distance between said rearwardly extending flanges. Because of the eccentric mounting of said disc, and its circumferential engagement with the rearwardly extending flanges of said secondary shield and gauge member, rotary movement of said disc produces substantially instantaneous slidable movement of said secondary shield and gauge member, in either an extensible or a retractible manner with respect to the main shield and gauge member 12, as will be readily understood.

In the present embodiment of the invention, the eccentric disc 14 is rotatably mounted on the rear, generally circular portion 33 of the nut upon whose hexagonal front portion 32 the secondary shield and gauge member 11 is slidably mounted. As shown in Fig. 2, the diameter of the nut portion 33 is substantially the same as the maximum cross dimension of the hexagonally-shaped rear end portion of the tubular member 10, so that the eccentric disc 14 may be slid onto said nut portion 33 from the rear end of said tubular member, as indicated in Fig. 3. As will be evident from Fig. 3, the eccentric disc covers the slot or elongated aperture 26 in the secondary shield and gauge member 11 and thus conceals said slot or aperture.

For convenient turning of the eccentric disc 14, to thereby produce sliding movement of the secondary shield and gauge member 11 relative to the main shield and gauge member 12, said disc is preferably provided with a suitable fingerpiece. In the present embodiment of the invention, said fingerpiece is in the form of a set screw 35 which, by suitable adjustment thereof, can be caused to forcibly engage the body portion of the secondary shield and gauge member 11 so as to releasably hold or lock such member in the desired extended or retracted relationship relative to the main shield and gauge member 12.

For the retention of the secondary shield and gauge member 11 and the eccentric disc 14 in operative assembly with the front end portion 13 of the tubular member 10, a resilient split ring 37 is here utilized, the ring being slid onto said tubular member from the rear thereof and having seating engagement on the front end portion of such member just forwardly of its annular shoulder, a shoulder which is provided by reducing the cross dimensional size of the front end portion of said tubular member. Thus, as shown in Fig. 2, the secondary shield and gauge member 11 and the eccentric disc 14 are both confined in place by and between the split ring 37 and the main shield and gauge member 12. If desired and as here shown, a retaining nut 40 may be threadedly mounted on the front end portion 13 of the tubular member 10, in front of the main shield and gauge member 12, although the use of such a separate retainer may not be regarded as necessary.

As will be readily understood from the foregoing description of the construction of the here illustrated shield and gauge structure, the two plate-like members 11 and 12 of such structure not only provide a protective shield for the operator of the tool with which the structure is used (protection against flying particles of the material into which the pins, studs and the like are fired by the use of said tool and protection also against ricocheting of said pins, studs and the like) but also provide a spacing gauge for the barrel of said tool.

When the secondary shield and gauge member 11 is in its fully extended position with respect to the main shield and gauge member 12, as in Fig. 1, not only is the area of the protective shield jointly provided by said members of the greatest possible extent, but the longitudinal axis of the tubular member 10, which receives the barrel of the tool with which the present structure is used, is spaced the maximum distance, the distance A in Fig. 1, from the gauge reference line 41 which is coincident with the outer surface of the rearwardly extending flange 30 of the secondary shield and gauge member 11.

When, however, the secondary shield and gauge member 11 is in its fully retracted position, as in Fig. 2, the protective shield of the present structure is at its minimum area, with the longitudinal axis of the barrel-receiving tubular member 10 being spaced the minimum distance, the distance B in Fig. 2, from the aforesaid gauge reference line 41. Between the Fig. 1 and Fig. 2 positions, various shield sizes and various gauge settings are obtainable, all as will be readily understood.

If desired, and as here shown, either or both of the end portions of the peripheral flange 25 of the main shield and gauge member 12 may be provided with distance marks or graduations 42, so as to denote the extent of the spacing of the longitudinal axis of the tubular member 10 from the aforesaid gauge reference line 41 when the slidably mounted secondary shield and gauge member 11 is in an extended position.

To those skilled in the art to which the present invention relates, further features and advantages of shield and gauge structures embodying the invention will be evident from the foregoing description of one such embodiment.

What is claimed is:

1. A safety shield and spacing gauge structure for powder-actuated tools having barrels through which pins, studs and the like are fired, said structure comprising a tubular element for the reception of the barrel of such a tool, a pair of shield and gauge members mounted on the front end portion of said tubular element and having plate-like body portions, one of said members being fixedly mounted on said tubular element and the other of said members being slidably mounted thereon for extensible and retractible movement relative to said fixedly mounted member, and means mounted on the front end portion of said tubular element for effecting extensible and retractible movement of said slidably mounted member.

2. A safety shield and spacing gauge structure for powder-actuated tools having barrels through which pins, studs and the like are fired, said structure comprising a tubular element for the reception of the barrel of such a tool, a pair of shield and gauge members mounted on the front end portion of said tubular element and having plate-like body portions, one of said members being fixedly mounted on said tubular element and the other of said members being slidably mounted thereon for extensible and retractible movement relative to said fixedly mounted member, and means rotatably mounted on the front end portion of said tubular element for effecting extensible and retractible movement of said slidably mounted member.

3. A safety shield and spacing gauge structure for powder-actuated tools having barrels through which pins, studs and the like are fired, said structure comprising a tubular element for the reception of the barrel of such a tool, a pair of shield and gauge members mounted on the front end portion of said tubular element and having plate-like body portions, one of said members being fixedly mounted on said tubular element and the other of said members being slidably mounted thereon for extensible and retractible movement relative to said fixedly mounted member, and eccentric means for effecting extensible and retractible movement of said slidably mounted member.

4. A safety shield and spacing gauge structure for powder-actuated tools having barrels through which pins, studs and the like are fired, said structure comprising a tubular element for the reception of the barrel of such a tool, a pair of shield and gauge members mounted on the front end portion of said tubular element and having plate-like body portions, one of said members being fixedly mounted on said tubular element and the other of said members being slidably mounted thereon for extensible and retractible movement relative to said fixedly mounted member, and an eccentric disc rotatably mounted on the front end portion of said tubular element for effecting extensible and retractible movement of said slidably mounted member.

5. A safety shield and spacing gauge structure for powder-actuated tools having barrels through which pins, studs and the like are fired, said structure comprising a tubular element for the reception of the barrel of such a tool, a pair of shield and gauge members mounted on the front end portion of said tubular element and having plate-like body portions, one of said members being fixedly mounted on said tubular element and the other of said members being slidably mounted thereon for extensible and retractible movement relative to said fixedly mounted member, and means for effecting extensible and retractible movement of said slidably mounted member, said means comprising opposed abutments on said slidably mounted member and eccentrically mounted means engageable with said abutments.

6. A safety shield and spacing gauge structure for powder-actuated tools having barrels through which pins, studs and the like are fired, said structure comprising a tubular element for the reception of the barrel of such a tool, and a pair of shield and gauge members mounted on the front end portion of said tubular element and each having a generally rectangular plate-like body portion, one of said members being fixedly mounted on said tubular element and having a forwardly extending peripheral flange of substantially continuous form and the other of said members being slidably mounted thereon for extensible and retractible movement relative to said fixedly mounted member, said slidably mounted member having forwardly extending flange portions which lie alongside portions of the peripheral flange of the fixedly mounted member and which aid in guiding the slidably mounted member in its slidable movement.

7. A safety shield and spacing gauge structure for powder-actuated tools having barrels through which pins, studs and the like are fired, said structure comprising a tubular element for the reception of the barrel of such a tool, a pair of shield and gauge members mounted on the front end portion of said tubular element and having plate-like body portions, one of said members being fixedly mounted on said tubular element and the other of said members being slidably mounted thereon for extensible and retractible movement relative to said fixedly mounted member, a member eccentrically mounted on the front end portion of said tubular element for effecting extensible and retractible movement of said slidably mounted shield and gauge member, and a resilient split ring for maintaining said eccentrically mounted member in operative assembly with said tubular element.

8. A safety shield and spacing gauge structure for powder-actuated tools having barrels through which pins, studs and the like are fired, said structure comprising a tubular element for the reception of the barrel of such a tool, a pair of shield and gauge members having plate-like body portions, the body portion of one of said members being threadedly mounted on the front end portion of said tubular element for substantially fixed relationship therewith and the body portion of the other of said members having an elongated aperture through which extends the front end portion of said tubular element for the slidable mounting of this last mentioned shield and gauge member, the slidable mounting of such member permitting it to have extensible and retractible movement relative to said threadedly mounted shield and gauge member, an eccentric disc surrounding the front end portion of said tubular element for effecting slidable movement of said slidably mounted shield and gauge member, and a single member for maintaining said slidably mounted shield and gauge member and said eccentric disc in operative assembly with the front end portion of said tubular element.

References Cited in the file of this patent

UNITED STATES PATENTS

| 2,648,840 | Farnsworth | Aug. 18, 1953 |
| 2,679,645 | Erickson | June 1, 1954 |

FOREIGN PATENTS

| 1,058,870 | France | Nov. 10, 1953 |